United States Patent
Pora et al.

(10) Patent No.: US 12,227,597 B2
(45) Date of Patent: Feb. 18, 2025

(54) CLEAN LABEL STABILIZED BUCKWHEAT STARCH

(71) Applicant: ROQUETTE FRERES, Lestrem (FR)

(72) Inventors: Bernard Pora, Shanghai (CN); Jovin Hasjim, Shanghai (CN); Jingling Tao, Shanghai (CN); Jie Sun, Shanghai (CN)

(73) Assignee: Roquette Freres, Lestrem (FR)

( * ) Notice: Subject to any disclaimer, the term of this patent is extended or adjusted under 35 U.S.C. 154(b) by 712 days.

(21) Appl. No.: 16/610,972

(22) PCT Filed: May 14, 2018

(86) PCT No.: PCT/EP2018/062358
§ 371 (c)(1),
(2) Date: Nov. 5, 2019

(87) PCT Pub. No.: WO2018/210741
PCT Pub. Date: Nov. 22, 2018

(65) Prior Publication Data
US 2021/0332155 A1    Oct. 28, 2021

(30) Foreign Application Priority Data
May 16, 2017    (CN) .................. 201710341956.1

(51) Int. Cl.
| | |
|---|---|
| C08B 30/04 | (2006.01) |
| A21D 2/18 | (2006.01) |
| A21D 13/80 | (2017.01) |
| A23C 9/13 | (2006.01) |
| A23C 9/137 | (2006.01) |

(Continued)

(52) U.S. Cl.
CPC ............ *C08B 30/046* (2013.01); *A21D 2/186* (2013.01); *A21D 13/80* (2017.01); *A23C 9/1307* (2013.01); *A23C 9/137* (2013.01); *A23L 29/212* (2016.08); *C08B 30/08* (2013.01); *A23V 2002/00* (2013.01)

(58) Field of Classification Search
CPC .......................... C08B 30/046; A23L 29/212
See application file for complete search history.

(56) References Cited

U.S. PATENT DOCUMENTS

| | | | |
|---|---|---|---|
| 2007/0116846 A1* | 5/2007 | Singh-Meneghini | ........................ A21D 2/364 426/550 |
| 2013/0309386 A1* | 11/2013 | Han | ...................... A23L 29/219 426/442 |

(Continued)

FOREIGN PATENT DOCUMENTS

| | | | |
|---|---|---|---|
| CN | 102578231 A | * | 7/2012 |
| CN | 103168812 A | * | 6/2013 |

(Continued)

OTHER PUBLICATIONS

CN 103168812 A Google Patents English Translation. (Year: 2013).*
(Continued)

*Primary Examiner* — Stephanie A Cox

(57) ABSTRACT

The present invention relates to a process for preparing stabilized buckwheat starches comprising a specific heat treatment. The present invention also relates to stabilized buckwheat starches obtainable by said process, as well as the use of said stabilized buckwheat starches for the preparation of a food product.

23 Claims, 7 Drawing Sheets

(51) Int. Cl.
*A23L 29/212* (2016.01)
*C08B 30/08* (2006.01)

(56) References Cited

U.S. PATENT DOCUMENTS

| | | | |
|---|---|---|---|
| 2015/0239994 A1* | 8/2015 | Santhanam | C08L 3/04 127/71 |
| 2016/0235075 A1 | 8/2016 | Okoniewska et al. | |
| 2016/0249627 A1 | 9/2016 | Okoniewska et al. | |

FOREIGN PATENT DOCUMENTS

| | | |
|---|---|---|
| CN | 103232549 A | 8/2013 |
| CN | 106417511 A | 2/2017 |
| WO | 9604316 A1 | 2/1996 |
| WO | 2013173161 A1 | 11/2013 |
| WO | 2014053833 A1 | 4/2014 |
| WO | 2015051236 A1 | 4/2015 |

OTHER PUBLICATIONS

The International Search Report and Written Opinion, mailed on Aug. 8, 2018, in the corresponding PCT Appl. No. PCT/EP2018/062358.

Liu et al., "Changes in physicochemical properties and in vitro digestibility of common buckwheat starch by heat-moisture treatment and annealing," Carbohydrate Polymers, pp. 237-244, Nov. 5, 2015. (Abstract).

Hasjim et al., "Milling of rice grains: Effects of starch/flour structures on gelatinization and pasting properties," Carbohydr Polym, Jan. 30, 2013;92(1):682-90.

Li et al., "Physicochemical Properties of Common and Tartary Buckwheat Starch," Cereal Chem. 74(1), Jan./Feb. 1997, pp. 79-82.

* cited by examiner

CLEAN LABEL STABILIZED BUCKWHEAT STARCH

CROSS-REFERENCE TO RELATED APPLICATIONS

This application is a National Stage Application of PCT/EP2018/062358 filed May 14, 2018, which claims priority from Chinese Patent Application No. 201710341956.1, filed on May 16, 2017. The priority of said PCT and Chinese Patent Application are claimed. Each of the prior mentioned applications is hereby incorporated by reference herein in its entirety.

FIELD OF THE INVENTION

The present invention relates to a process for preparing stabilized buckwheat starches comprising a specific heat treatment. The present invention also relates to stabilized buckwheat starches obtainable by said process, as well as the use of said stabilized buckwheat starches for the preparation of a food product.

BACKGROUND

In the food industry, starch is a very important ingredient. It is used, amongst other things, as a texturing agent, gelling agent, thickener and stabilizer. Natural, unmodified starches (known as "native" starches) do not have all the required properties for such applications.

Hydration and swelling of starch granules provide the thickening properties of starch. Indeed, in presence of water, starch granules form an aqueous starch suspension. When the aqueous starch suspension is heated, starch granules start to swell, the viscosity of the starch suspension increases progressively until the swollen, hydrated starch granules burst.

Accordingly, in the presence of shear and/or under acidic conditions, the native starch suspension reaches an initial peak in viscosity first, then its viscosity of quickly decreases again. Such pasting profile is not suitable in most food application, particularly for a thickened product. Many native starches also undergo retrogradation, changing the texture of food during storage.

Instead, it is usually desirable that the thickened product has a viscosity which remains stable during processing (such as heating) and during storage (low retrogradation), even in the presence of shear and/or under acidic conditions.

In many food applications, it is required to provide starches having heat resistance (i.e. viscosity stability), shear resistance and acid resistance, as well as low tendency to retrograde during storage.

Various methods have therefore been developed to improve the properties of native starch. Starch obtained by such methods is often referred to as "stabilized starch". Generally, the formation of cross-links and/or intermolecular bridges between the polysaccharides enables the stabilization of the starch.

Stabilized starches can be produced very successfully by using chemical methods, involving cross-linking reagents such as phosphorus oxychloride, sodium trimetaphosphate and epichlorohydrin. Such stabilized starches are generally referred to as "chemically-modified starches" or "cross-linked starches". These chemically-modified starches, such as the commercial CLEARAM®, are able to offer the required properties in terms of heat, shear and acid resistance and low tendency to retrograde.

Over the last ten years, consumers have become increasingly reluctant to purchase products with a list of chemical substances on the label, or chemically modified ingredients. For that reason, food manufacturers are taking up the challenge to deliver "clean label" food products, i.e. non-chemically modified products.

One process for preparing "clean label" stabilized starch is by performing a physical treatment, more particularly a temperature treatment of the native starch in presence of water or under dry conditions.

More precisely, there are two common hydrothermal techniques known for modifying uncooked granular starch: heat moisture treatment and annealing. Basically, heat moisture treatment is usually carried out in a relative low moisture (<35%) and high temperature (90-120° C.) conditions. Annealing is performed above the glass transition and below the gelatinization temperature in excess of water.

Another way to produce clean label starches is by heating starch at extremely high temperature (above 120° C. but below 200° C.) in dry or anhydrous conditions. Such process is commonly called thermal inhibition treatment.

Example of commercial starches prepared by such temperature treatment is NOVATION® 2300, which is disclosed in the patent EP0721471B1.

Another example of commercial inhibited starch is CLARIA+®, which is disclosed in the patent applications WO2013/173161A1 and WO2014/053833A1. The inhibition treatments are heating in an alcoholic medium in the presence of bases or salts and heating in an aqueous medium in the presence of residual proteins and an active chlorine compound, respectively.

These two commercial starches are waxy maize based starches.

The present invention proposes a novel process for preparing a novel clean label buckwheat stabilized starch, said starch having similar or even improved heat, shear and acid resistances and low tendency to retrograde compared to the known products (either chemically cross-linked starches or physically modified starches).

Indeed, it has been found that a highly stabilized buckwheat starch can be produced by treating said specific starch, buckwheat starch, at a very specific range of temperature.

Additionally, consumers are looking for slowly digestible carbohydrates which are healthier than rapidly digestible and absorbable carbohydrates. In particular, it is known that slowly digestible carbohydrates increase the feeling of satiety and provide glucose to the brain over an extended period thereby improving the cognitive functions.

Current functional clean-label starches, made from waxy based starches, can be in pre-gelatinized form and/or easily gelatinized during the heating process and thus rapidly digested.

There is thus a need for clean label starches which can be digested slowly than usual clean labels.

It is known that raw native starch is digested slower than gelatinized starch. However, native starch like high-amylose starch, normally used to increase the feeling of satiety, contains mainly resistant starch, a not slowly digestible starch. Furthermore, due to its poor functionalities, such as low swelling and degree of gelatinization, it deteriorates the mouthfeel once incorporated in food products.

Since the cell wall can protect the starch from being rapidly hydrolyzed by digestive enzymes, whole wheat flour, buckwheat flour (including groats and cuts), oat flour, and other cereal flours, which are disclosed in the patent applications US 2016/0235075 A1, US 2016/0249627 A1, WO 2015/051228 A1, WO 2015/051236 A1, CN 105578886

A, also known to provide high dietary fiber content, have been used as slow digestible carbohydrates source. However, due to the cell wall limiting the swelling power of starch, the mouthfeel of biscuits made from these flours are not pleasant, biscuits normally having a very dense and hard texture. As disclosed in CN 106417511 and CN 103168812 A, there are also examples of tartary buckwheat flour for biscuits with low GI.

There is thus a need for slowly digestible carbohydrates which can be used for the manufacture of food products without deteriorating the mouthfeel of said products. In particular, it is important to find a clean label starch which simultaneously is good for health, is less or not processed, can improve the mouthfeel of biscuits and has slow digestion properties. The present inventors have surprisingly found that stabilized buckwheat starch according to the present invention fulfil these criteria. In particular, buckwheat is an ancient grain which is perceived as a healthy ingredient by the consumers.

SUMMARY OF THE INVENTION

A first object of the present invention is a process for preparing stabilized buckwheat starch from native buckwheat starch, the process comprising the following steps:
a) preparing a suspension of native buckwheat starch in an aqueous medium, preferably at a concentration from 20 to 50% by weight, more preferably at a concentration from 30 to 40% by weight at a temperature T1 comprised between room temperature and 50° C., for example between room temperature and 45° C.;
b) heating the aqueous suspension up to a temperature Ts that does not exceed 60° C., said heating step comprising:
  i. a first stage of slow heating, at a rate comprised between 0.2° C. and 5° C. per hour, from T1 up to said temperature Ts, said temperature Ts comprised in the range from 50 to 60° C., preferably in the range from 53° C. to 58° C., more preferably in the range from 53° C. to 55° C. and,
  ii. a second stage of heating at said temperature Ts for at least 30 minutes, preferably from 0.5 to 24 hours, for example from 1 to 18 hours, in particular from 1 to 5 hours, notably for 3 hours, so as to obtain the stabilized buckwheat starch,
c) separating the stabilized buckwheat starch from the aqueous medium;
d) drying said stabilized buckwheat starch;
e) recovering said stabilized buckwheat starch.

As used herein the expression "native buckwheat starch" refers to buckwheat starch coming from natural source. It is not a result of physical or enzymatic or chemical processing methods.

Native buckwheat starch is recovered from buckwheat grain (*Fagopyrum esculentum*) by extraction processes. Buckwheat starch can be extracted directly from buckwheat groat or from buckwheat flour having high starch content (50-70% of starch in groat and flour).

In the present document, "native buckwheat starch" can be designated by other terms such as "control starch" or "uninhibited starch" or "non-modified starch" or "non-stabilized starch".

As used herein the expression "stabilized buckwheat starch" refers to a buckwheat starch which is thermally modified, preferably according to the process of the present invention, contrary to the native buckwheat starch, and which has at least the characteristics of a chemically cross-linked starch, such as those of chemically cross-linked waxy maize starch.

The thermal modification treatment according to the process of the present invention impacts positively the pasting profile and the gelatinization temperature of the buckwheat starch and consequently its heat, shear and acid resistances, without using chemicals, while maintaining its low tendency to retrograde.

In the presence of heat, shear and/or under acidic conditions, the stabilized buckwheat starch according to the present invention resists swelling or swells to a limit extent and/or at a higher temperature (a pasting temperature up to 93° C.). Bursting is thus prevented.

The stabilized buckwheat starch has an increased heat, shear and acid resistance compared to the one of the native buckwheat starch, while maintaining its low tendency to retrograde. These properties are comparable to or better than those of some commercial modified starches, such as CLARIA+®, CLEARAM® CJ 5025 and NOVATION® 2300.

In the present document, "stabilized buckwheat starch" can be designated by other terms such as "heat modified starch according to the process of the present invention", "heat modified buckwheat starch" or "annealed buckwheat starch".

A second object of the present invention is a stabilized buckwheat starch obtainable by the process according to the first object or a stabilized buckwheat starch obtained by the process according to the first object.

A third object of the present invention is the use of a stabilized buckwheat starch according to the second object for the preparation of a food product, in particular for the production of yogurt. Another object of the present invention is the use of a stabilized buckwheat starch according to the second object for the preparation of a biscuit.

A fourth object of the present invention is a food product comprising a stabilized buckwheat starch according to the second object. In a preferred embodiment, the food product is a yogurt. In another preferred embodiment, the food product is a biscuit.

DETAILED DESCRIPTION

In the process of the present invention, the first step (step a)) consists of preparing a suspension from native buckwheat starch, preferably at a concentration from 20-50% by weight, more preferably from 30 to 40% by weight, at a temperature T1 comprised between room temperature (20° C.) and 50° C., for example room temperature and 45° C.

The native buckwheat starch useful for the present invention is recovered from native sources. It can be extracted from buckwheat groat or from buckwheat flour. A typical extraction process comprises the following steps:
1) preparing, at a temperature equal to or below 50° C., an aqueous suspension from the buckwheat flour or from the buckwheat groat with a pH between 7 and 9;
2) fractionating the aqueous suspension by density so as to obtain a light fraction comprising proteins, soluble carbohydrates and salts, and a heavy fraction comprising starch and fibers, preferably by using a horizontal screw decanter, a centrifugal decanter or a hydrocyclone;
3) adding water to the heavy fraction at a temperature comprised between room temperature and 50° C., so as to resuspend the heavy fraction;

4) separating the fiber fraction from the starch fraction by the difference in particle sizes at a temperature comprised between room temperature and 50° C., preferably by filtration, by using sieves;
5) treating the starch fraction at pH between 7 and 9 and at a temperature comprised between room temperature and 50° C. at least one time, so as to remove remaining proteins;
6) neutralizing the pH of starch fraction to 5-7.
7) drying the starch fraction, preferably by using fluidized bed dryer or hot air dryer;
8) recovering the dried starch.

According to one embodiment of the process according to the present invention, the starch suspension useful for the present invention is prepared from the neutralized starch fraction (resulting from step 6), prior to drying step 7) during the starch extraction process).

The preparation of the suspension can also be for instance achieved by:
a1) direct mixing of the starch with warm water at a temperature T1 comprised between 40° C. and 50° C., preferably between 40° C. and 45° C., for example of 45° C.,
a2) equilibrating the resulting aqueous suspension in a heating vessel set at 45° C., or
a3) mixing starch with water at room temperature then rapid heating the resulting aqueous suspension at a rate of 5° C. to 50° C. per hour up to a temperature T1, for example comprised between 40° C. and 45° C., preferably of 45° C.

Step b) of the process according to the present invention consists of heating the aqueous suspension up to a temperature Ts that does not exceed 60° C., more particularly up to a temperature Ts comprised in the range from 50 to 60° C., for example 52 to 60° C., preferably in the range from 53° C. to 58° C., more preferably in the range from 53° C. to 55° C.

In more general terms, the process according to the present invention does not include any thermal treatment at a temperature above 60° C.

Heating the native starch at a temperature comprised in the range from 50 to 60° C. induces the mobility of the crystallites in the starch granules, allowing the formation of more perfect crystalline structure and increasing its melting temperature.

Thus, the heating impacts positively the crystalline structure of the starch and in the same way its pasting property. The stabilized buckwheat granular starch resists swelling or swells to a limit extent and/or at a higher temperature (a pasting temperature up to 93° C.) The bursting is thus prevented. In the presence of heat, shear and/or under acidic conditions, the viscosity of the stabilized buckwheat starch continues to rise or does not show a dramatic changes in viscosity during heating and shearing as observed with the native starches.

Heating the native buckwheat starch at a temperature below 50° C. for instance at 48° C. does not induce any significant modification of the starch. The starch does not show any significant improved properties.

In other words, heating the native buckwheat starch at a temperature below 50° C. does not allow stabilizing the starch.

On the contrary, heating the native starch at a temperature above 60° C. induces a rather significant (partial) gelatinization of the starch. The starch loses progressively its crystalline structure and eventually its granular structure. Thus, the heating at a temperature above 60° C. impacts negatively the crystalline structure of the starch. Consequently the granular starch will lose both its heat and shear resistances.

The heating step according to the present invention at a temperature comprised in the range of 50 and 60° C., preferably in the range of 53° C. and 58° C., more particularly in the range of 53° C. and 55° C. is particularly advantageous for buckwheat starch, unlike pea starch or maize starch.

Indeed, heating aqueous suspensions of pea starch and of maize starch up to a temperature comprised between 50° C. and 60° C. does not allow obtaining a modified starch with heat, shear and acid resistance as good as the one of the buckwheat starch modified according to the present invention.

In the presence of heat, shear and/or under acidic conditions, the viscosity of the pea and maize starches thus heat modified reaches an initial peak, then the viscosity decreases quickly. As previously mentioned, such pasting profile is not suitable for food application, particularly for a thickened product.

Moreover, the pea starch or the maize starch heat modified at the temperature range of 50° C. to 60° C. exhibits lower pasting temperature (lower heat resistance) compared to the stabilized buckwheat starch according to the present invention having a pasting temperature comprised between 80 and 95° C., preferably between 82 and 93° C., for example between 85 and 90° C. Pasting temperature is the temperature at which the viscosity starts to increase during the gradual increase in heating temperature.

The maize starch and pea starch exhibit higher tendency to retrograde than buckwheat starch, either for native or after thermal modification according to the process of the present invention. Some commercial clean label starches of waxy maize starch base also exhibit higher tendency to retrograde than native and stabilized buckwheat starches.

Step b) of the process according to the present invention comprises
i. a first stage of slow heating, at a rate comprised between 0.2° C. and 5° C. per hour, from T1 up to said temperature Ts, said temperature Ts comprised in the range from 50 to 60° C., preferably in the range from 53° C. to 58° C., more preferably in the range from 53° C. to 55° C. and,
ii. a second stage of heating at said temperature Ts for at least 30 minutes, preferably from 0.5 to 24 hours, for example from 1 to 18 hours, in particular from 1 to 5 hours, notably for 3 hours, so as to obtain the stabilized buckwheat starch, The first stage of the heating step b) can be carried out either in a continuous manner or in a stepwise manner. Thus, during said first stage of the heating step b) the aqueous suspension can be heated stepwise up to Ts.

More particularly, the first stage of the heating step b) can comprise at least two successive isothermal heating steps, respectively at a temperature T2 and T3, each isothermal heating step being independently of at least 30 minutes, preferably of 1 to 4 hours, for example 3 hours.

Step c) of the process according to the present invention consists of separating the stabilized buckwheat starch of step b. from the aqueous medium. In a preferred embodiment, the stabilized buckwheat starch is separated from the aqueous medium by using a filtration unit, such as plate filter and centrifugal filter.

Step d) of the process according to the present invention consists of drying said stabilized buckwheat starch.

Such step is carried out preferably by using oven dryer, vacuum oven dryer, fluidized bed dryer, or hot air dryer. In a preferred embodiment, the drying step d) of the stabilized buckwheat starch is carried out by using oven dryer. Such drying process is simple, cost-effective, reproducible and scalable process. This step is performed preferably at a temperature comprised between room temperature and the buckwheat starch gelatinization temperature, more preferably at a temperature comprised between 50 and 55° C.

The drying of the stabilized buckwheat starch is stopped when the stabilized buckwheat starch has a moisture rate lower or equal to 12%.

Alternatively, step d) of the process according to the present invention consists of removing water from the stabilized buckwheat starch.

Advantageously, the process of the present invention is free of organic solvents and free of chemical reactants. All the steps of the process are performed in water. There is no chemical transformation. Thus, the process proposed can be advantageously categorized as clean label process. The products obtained from the process according to the invention are therefore also clean label ingredients.

A second object of the present invention is a stabilized buckwheat starch obtainable by the process according to the first object.

The stabilized buckwheat starch obtainable or obtained by the process according to the invention is not gelatinized but is under granular form. It is functionally similar to chemically cross-linked starches. It has a non-cohesive, smooth texture and has excellent resistance to processing variables such as heat, shear and low pH, particularly for a significant time under such conditions.

The increase of viscosity of the stabilized buckwheat starch obtainable or obtained by the process according to the invention is delayed during heating, slowed down compared to the same starch which has not been modified in accordance with the present invention.

The stabilized buckwheat starch according to the present invention has typically an onset gelatinization temperature measured by Differential Scanning calorimetry (DSC) up to 10° C. higher than the onset gelatinization temperature of the native buckwheat starch. It has an onset gelatinization temperature measured by DSC comprised between 60 and 69° C. It has a retrogradation rate measured by DSC comprised between 23 and 40%, preferably between 23 and 33% after 7-day storage at 4° C. upon gelatinization.

The pasting temperature measured by Rapid Visco Analyser (RVA) of the buckwheat starch according to the present invention or which has been heat modified according to the process of the present invention is higher than the same starch which has not been heat treated using the process of the present invention. Its pasting temperature is typically comprised between 80 and 95° C., preferably between 82 and 93° C., for example between 85 and 90° C.

In addition, the stabilized buckwheat starch has a different pasting profile compared to the same starch which has not been treated using the process of the present invention. Indeed, the viscosity of the stabilized starch increases progressively over time and/or does not show a dramatic changes in the viscosity in presence of heat, shear and/or acid conditions, compared with the same starch which has not been treated using the process of the present invention (native starch or starch treated below the temperature range).

A third object of the present invention is the use of a stabilized buckwheat starch according to the second object for the production of a food product, in particular for the production of yogurt. Another object of the present invention is the use of a stabilized buckwheat starch according to the second object for the preparation of a biscuit.

A fourth object of the present invention is a food product comprising a stabilized buckwheat starch according to the second object, i.e. comprising a stabilized buckwheat starch obtainable, or a stabilized buckwheat starch obtained by the process of the present invention. In a preferred embodiment, the food product is a yogurt. In another preferred embodiment, the food product is a biscuit.

Thanks to its high heat resistance, as well as shear and acid resistance, the stabilized buckwheat starch prepared according to the present invention is particularly suitable for use in a wide range of food applications, especially food applications where heat, shear and acid resistance are required. Its low tendency to retrograde is also desirable to prevent the textural changes of food products during storage.

Food products wherein the stabilized buckwheat starches according to the present invention are useful include thermally-processed foods, acid foods, dry mixes, refrigerated foods, frozen foods, extruded foods, oven-prepared foods, stove top-cooked foods, microwaveable foods, full-fat or fat-reduced foods, and foods having a low water activity. Food products wherein the stabilized buckwheat starches are particularly useful are foods requiring a thermal processing step and/or harsh shearing processing step such as pasteurization, retorting, ultra-high temperature (UHT) processing and/or homogenization. The stabilized buckwheat starches are particularly useful in food applications where stability is required through all processing temperatures including cooling, freezing and heating.

The stabilized buckwheat starches are also useful in food products where a non-chemically cross-linked starch thickener, viscosifier, gelling agent, or extender is required or desirable. More particularly, the stabilized buckwheat starches provide a desirable smooth texture to the processed food product and maintain their capacity for thickening throughout processing operations. Based on processed food formulations, those skilled in the art may readily select the amount of stabilized buckwheat starch required to provide the necessary thickness and gelling viscosity in the finished food product, as well as the desired texture. Typically, the starch is used in an amount of from about 0.1 to about 35%, for example from about 2 to about 6%, by weight, of the food product.

According to the present invention, the stabilized buckwheat starch is used for the preparation of biscuits. In particular, the stabilized buckwheat starch replaces partially wheat flour in biscuits thereby supplying slowly digestible carbohydrates and improving the mouthfeel of biscuits.

The stabilized buckwheat starch is a clean label starch having higher pasting temperature than most starches. Thus, it is not completely swollen during heating and it will retain some of the slow digestion properties after being heated in a low moisture system such as biscuits. Such biscuits may therefore be used to prolong the feeling of satiety, such as meal replacement or meal to go.

Furthermore, since it is partially swollen and/or gelatinized, it does not deteriorate and even can improve the mouthfeel of biscuits.

In a particular embodiment, the stabilized buckwheat starch is used in an amount of from about 0.1 to about 35%, preferably from about 2 to about 10%, and more preferably from about 4 to about 8%, by weight, of the biscuit.

The invention will now be illustrated by means of the following figures and examples, it being understood that these are intended to explain the invention, and in no way to limit its scope.

starch samples were then stored few days at room temperature before performing a DSC analysis. Each sample (2-3 mg) was mixed with water at three times the weight of starch. The mixture was hermetically sealed in an aluminum pan. The pan was allowed to equilibrate for at least 1 hour and then heated from 10 to 100° C. at 10° C./min in order to obtain starch gelatinization properties.

After 7 days of storage at 4° C., the pan was equilibrated at room temperature for at least 1 hour and reanalyzed using DSC at the same temperature range and heating rate in order to obtain starch retrogradation properties. Starch retrogradation is the recrystallization of starch molecules after gelatinization. The rate of retrogradation is the highest at cold temperature above the glass transition temperature of starch gel, such as at refrigeration temperature. It can change the texture of food, such as increased viscosity, gel formation, reduced clarity and syneresis.

The DSC results are summed up in the following table:

TABLE 1

| | | Heating | Gelatinization | | | | Melting of retrograded starch | | | | |
|---|---|---|---|---|---|---|---|---|---|---|---|
| Starch | | temperature (° C.) | To (° C.) | Tp (° C.) | Te (° C.) | ΔH (J/g) | To (° C.) | Tp (° C.) | Te (° C.) | ΔH (J/g) | R* % |
| Buckwheat | | Native | 57.5 | 65.2 | 72.5 | 13.3 | 39.8 | 51.1 | 61.3 | 3.8 | 29.0 |
| | | 55 | 65.2 | 67.9 | 71.4 | 10.8 | 39.5 | 48.9 | 60.0 | 2.6 | 23.8 |
| | | 58 | 67.8 | 70.2 | 73.3 | 10.4 | 39.6 | 49.6 | 59.9 | 2.6 | 25.3 |
| | | 60 | 68.1 | 70.4 | 73.4 | 8.0 | 39.2 | 50.0 | 60.3 | 2.6 | 32.2 |
| | | 63 (comparative) | 71.4 | 73.6 | 76.5 | 4.4 | 40.6 | 50.2 | 60.2 | 3.2 | 73.6 |
| Comparative Examples | Maize | Native | 65.6 | 70.1 | 74.3 | 13.8 | 38.7 | 51.6 | 62.7 | 6.4 | 46.3 |
| | | 55 | 66.9 | 71.0 | 74.9 | 13.9 | 39.9 | 51.4 | 61.9 | 5.9 | 42.6 |
| | | 58 | 68.6 | 71.6 | 74.8 | 13.6 | 38.5 | 51.3 | 62.0 | 5.9 | 43.4 |
| | | 60 | 70.0 | 72.5 | 75.4 | 12.9 | 38.7 | 51.1 | 62.8 | 6.8 | 52.7 |
| | | 63 | 73.0 | 75.1 | 77.6 | 10.0 | 39.5 | 50.8 | 62.2 | 6.2 | 62.2 |
| | Pea | Native | 58.9 | 65.4 | 73.4 | 11.2 | 39.8 | 56.1 | 69.4 | 7.8 | 70.2 |
| | | 55 | 67.5 | 70.0 | 73.5 | 12.0 | 39.5 | 53.6 | 68.9 | 7.3 | 60.8 |
| | | 58 | 69.7 | 72.0 | 75.2 | 11.3 | 40.0 | 53.4 | 67.6 | 6.5 | 57.9 |
| | | 60 | 71.5 | 73.8 | 77.0 | 11.1 | 41.0 | 53.1 | 68.0 | 6.8 | 60.7 |
| | | 63 | 73.0 | 75.0 | 77.7 | 10.2 | 39.7 | 53.9 | 69.4 | 7.7 | 75.4 |

(To: onset temperature, Tp: peak temperature, Te: endset temperature, R*: retrogradation rate = ΔH gelatinization/ΔH melting of retrograded starch*100%)

Figure 5:
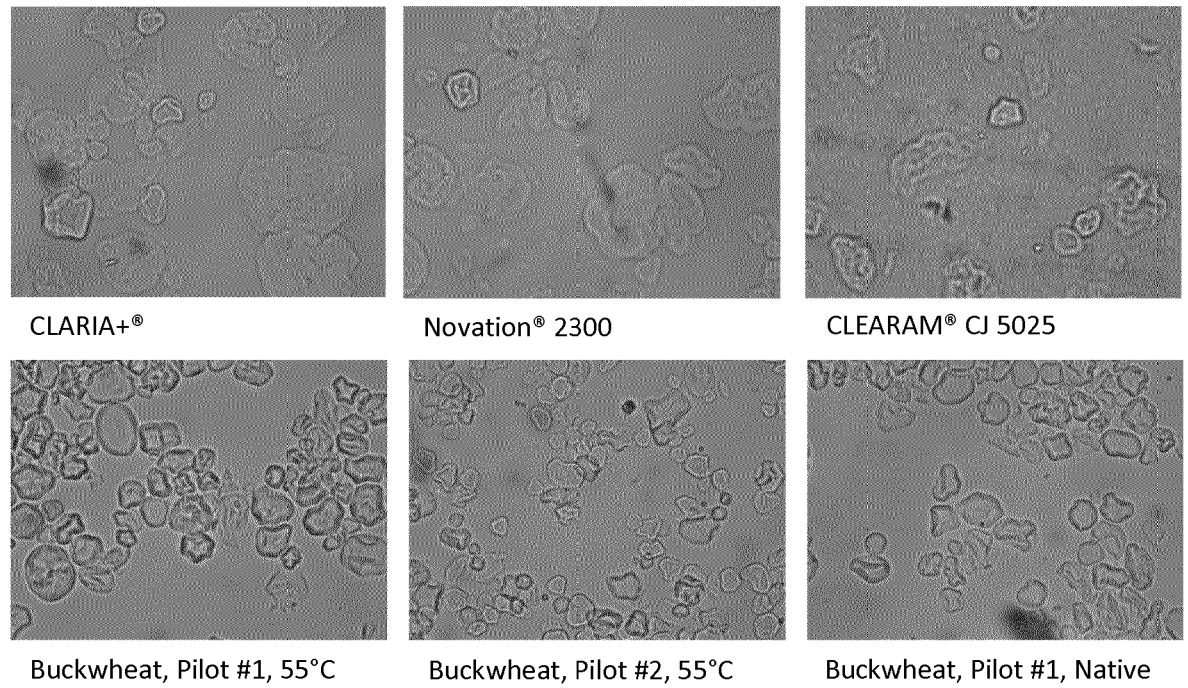

FIG. 5 shows the microscopic observations of starch status after being pre-heating, homogenization and sterilization processes in Example 4.

Figure 6:
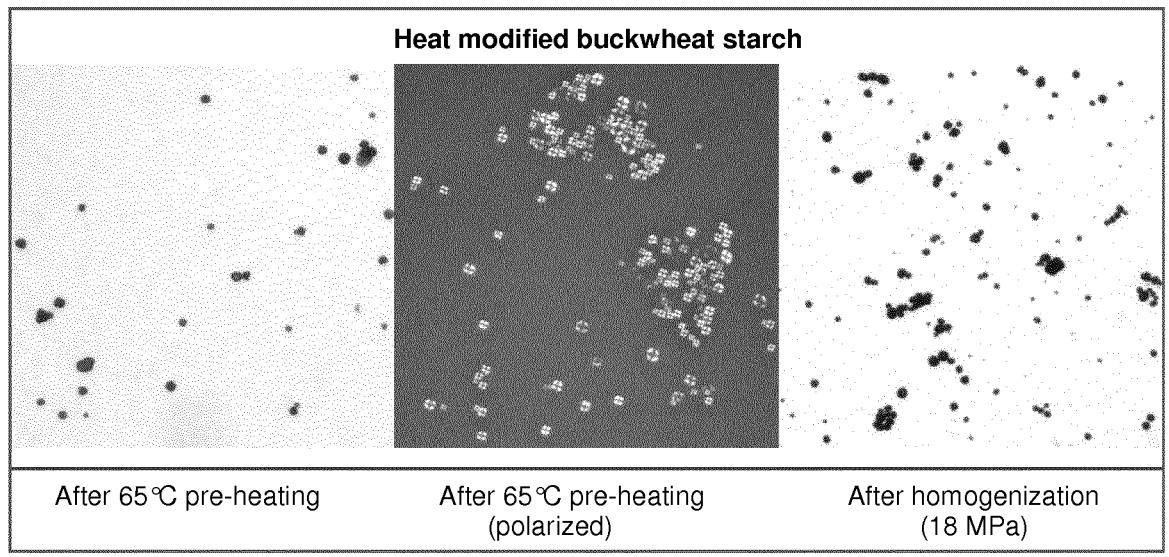
Figure 6:
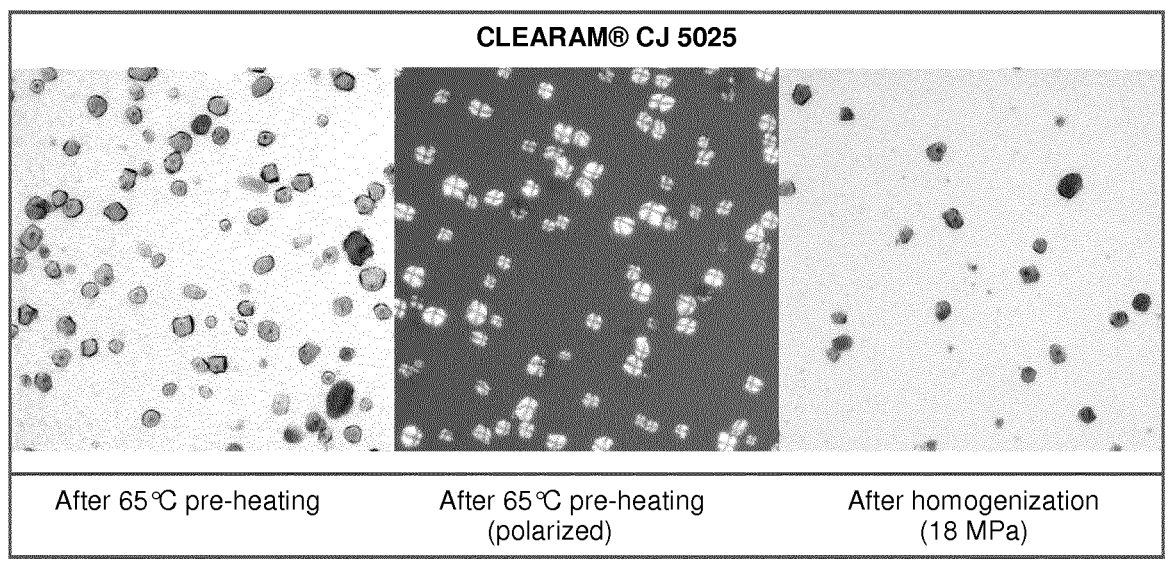

FIG. 6 shows the microscopic observation of starch status at different stages of the process for preparing yogurt in Example 5.

Figure 7:
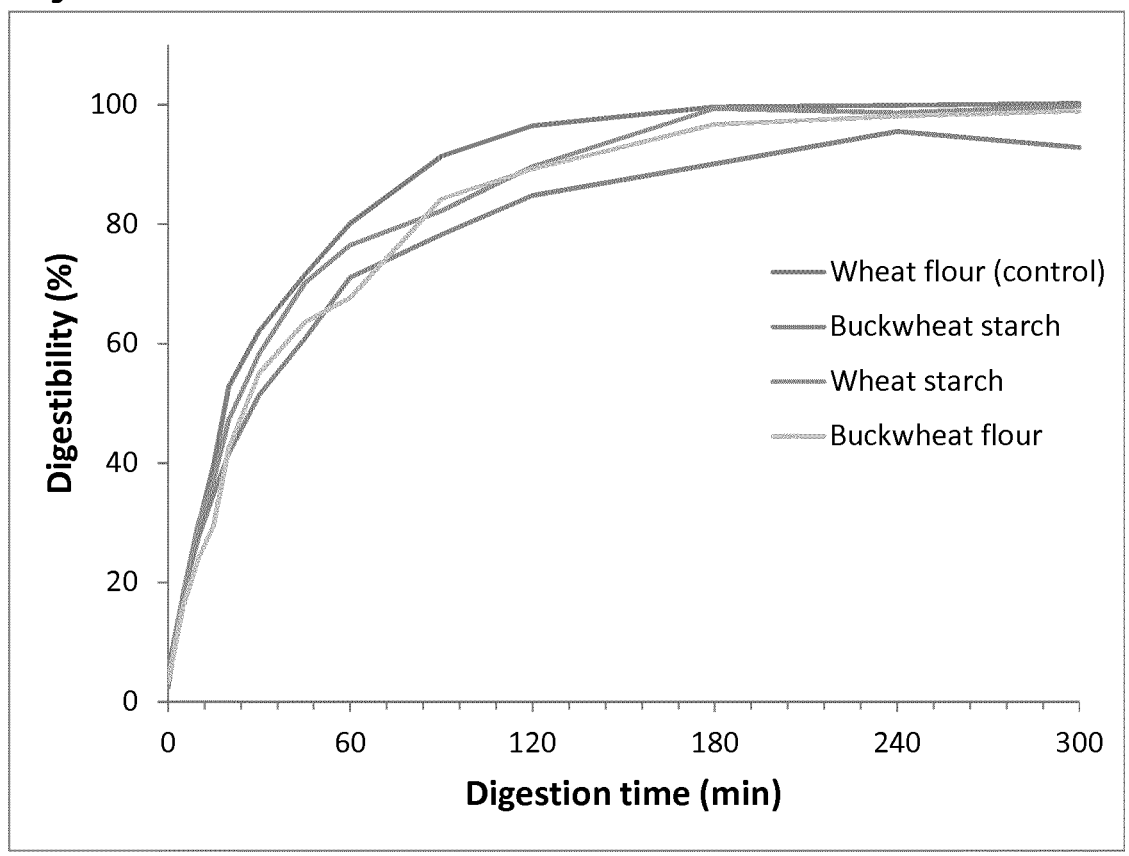

FIG. 7 shows the digestibility parameters of biscuits made from stabilized buckwheat starch according to the present invention in comparison to biscuits made from whole wheat flour (control), wheat starch or buckwheat flour.

EXAMPLES

Example 1

Dry native buckwheat starch, native pea starch and native maize starch (100 g each) were suspended respectively into excess of water (more than two times the weight of the starch). The 3 aqueous suspensions were then heated sequentially in a water bath at 55, 58, 60 and 63° C. (heat modification); each temperature was held for at least one and a half hours.

Sampling was performed before increasing the temperature. After sampling, all the starch samples were vacuum filtered to remove excess of water and dried in an oven at 50° C. until obtaining moisture rate lower or equal to 12%. The Based on these results, it appears that the gradual heating of the native starches of buckwheat, of maize and of pea to a temperature up to 63° C. increases their respective gelatinization temperatures.

The gelatinization temperatures of all three starches increase with the heating treatment temperature, meaning that higher heating treatment temperature results in higher heat resistance of the starch. Thus, the granules of heat modified starches can survive harsh processing treatments, especially at high temperature, and maintain the viscosity of the starch paste during processing (no shear thinning). However, higher heat resistance can also mean lower degree of granular swelling, which may decrease the viscosity of the starch paste at a specific processing temperature and can be undesirable for a thickened food product.

The onset temperatures of three starches are similar after the same heating treatment. In general, the heat modified maize starches and the heat modified pea starches have higher endset temperatures than the heat modified buckwheat starches.

It also appears that the buckwheat starch heat modified above 58° C. has a more prominent decreased enthalpy change of gelatinization compared to the native buckwheat starches, meaning that the buckwheat starches heat modified above 58° C. go through a partial gelatinization. This phenomenon is not obvious for the corresponding pea and maize starches heat modified up to 63° C.

All gelatinized starches (including the heat modified starches) undergo retrogradation during storage, especially at cold temperature. Indeed, the gelatinized and stored starches have similar melting temperatures (of retrograded starch). The enthalpy change is starch dependent, but is less dependent on the heating treatment. Both native and heat modified buckwheat starches exhibit the lowest degree of retrogradation compared to the native and heat modified pea starches and the native and heat modified maize starches. The buckwheat starches have retrogradation rates comprised between 24 and 32% (excluding the buckwheat starch heat modified at 63° C. due to high degree of pregelatinization prior to DSC analysis). The pea starch exhibits the highest degree of retrogradation.

Figure 1:
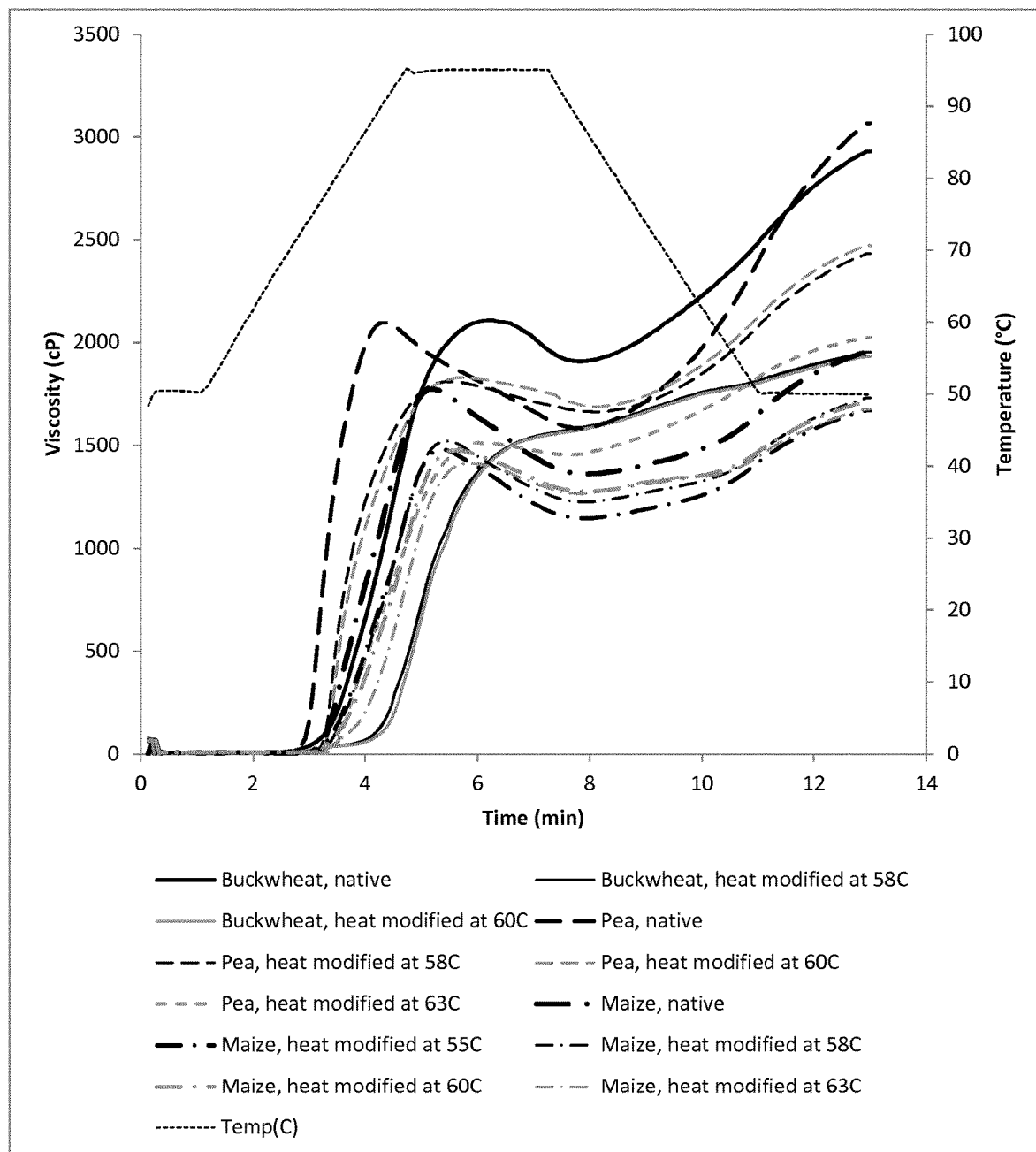
FIG. 1 shows the pasting characteristics of heat modified starches obtained in Example 1 using a Rapid Visco Analyser (RVA)

The pasting properties of each (ungelatinized) sample were measured using a rapid visco-analyzer (RVA). (See FIG. 1) Pasting properties are the ability of granular starch to develop viscous paste during heating, followed by further viscosity changes with shearing and cooling. Starch with good pasting properties will not show extreme viscosity changes with shearing at high temperature, especially decreasing viscosity also known as shear thinning or breakdown. Increasing viscosity during cooling is not desirable if starch is used as a thickener because the paste will form gel during longer storage (retrogradation).

The RVA analysis was carried out for 13 minutes. Each starch sample (2 g dry weight) was mixed with water to give a total of 25 g (8% starch suspension). It was isothermally heated at 50° C. for 1 minute, increased to 95° C. at 12° C./minute, held at 95° C. for 2.5 minutes, cooled to 50° C. at 12° C./minute, and finally held at 50° C. for 2 minutes. The stirring speed of the paddle was set at 960 rpm for the first 10 seconds and then decreased to 160 rpm throughout the rest of the analysis.

The RVA results are summed up in the following table:

TABLE 2

| Starch | | Heating temperature (° C.) | Pasting Temperature (° C.) | Peak Viscosity (cP) | Trough (cP) | Breakdown (cP) | Final Viscosity (cP) | Setback (cP) |
|---|---|---|---|---|---|---|---|---|
| Buckwheat | | Native | 76.7 | 2108 | 1909 | 199 | 2930 | 1021 |
| | | 58 | 88.9 | ND | ND | ND | 1952 | ND |
| | | 60 | 89.7 | ND | ND | ND | 1933 | ND |
| Comparative Examples | Maize | Native | 76.6 | 1773 | 1362 | 411 | 1954 | 592 |
| | | 55 | 77.4 | 1481 | 1147 | 334 | 1670 | 523 |
| | | 58 | 77.5 | 1522 | 1227 | 295 | 1731 | 504 |
| | | 60 | 77.5 | 1476 | 1278 | 198 | 1713 | 435 |
| | | 63 | 82.3 | 1413 | 1268 | 145 | 1677 | 409 |
| | Pea | Native | 71.8 | 2096 | 1583 | 513 | 3066 | 1483 |
| | | 58 | 75.9 | 1811 | 1663 | 148 | 2434 | 771 |
| | | 60 | 76.7 | 1831 | 1688 | 143 | 2473 | 785 |
| | | 63 | 79.2 | 1513 | 1455 | 58 | 2024 | 569 |

(Pasting temperature is the temperature at which viscosity starts to develop, peak viscosity is the maximum viscosity during heating, trough is the minimum viscosity during isothermal heating at 95° C., breakdown is the difference between peak viscosity and trough, final viscosity is the maximum viscosity during cooling to 50° C., and setback is the difference between final viscosity and trough; ND = not detectable)

Based on the RVA results, it appears that without adjusting the pH (pH ~5), the heat modified buckwheat starch has a higher pasting temperature compared to the heat modified pea starch and the heat modified maize starch. Pasting temperature is the temperature at which the viscosity starts to develop. The heat modified buckwheat starch has no or very low viscosity breakdown (or shear thinning) during isothermal heating and shearing, contrary to the heat modified pea starch and the heat modified maize starch. That means that the heat modified buckwheat starch according to the present invention exhibits higher heat and shear resistance compared to the corresponding pea and maize starches.

It also appears that there is no obvious difference on the RVA profile between the buckwheat starch heat modified at 58° C. and the one heat modified at 60° C.

Figure 2:
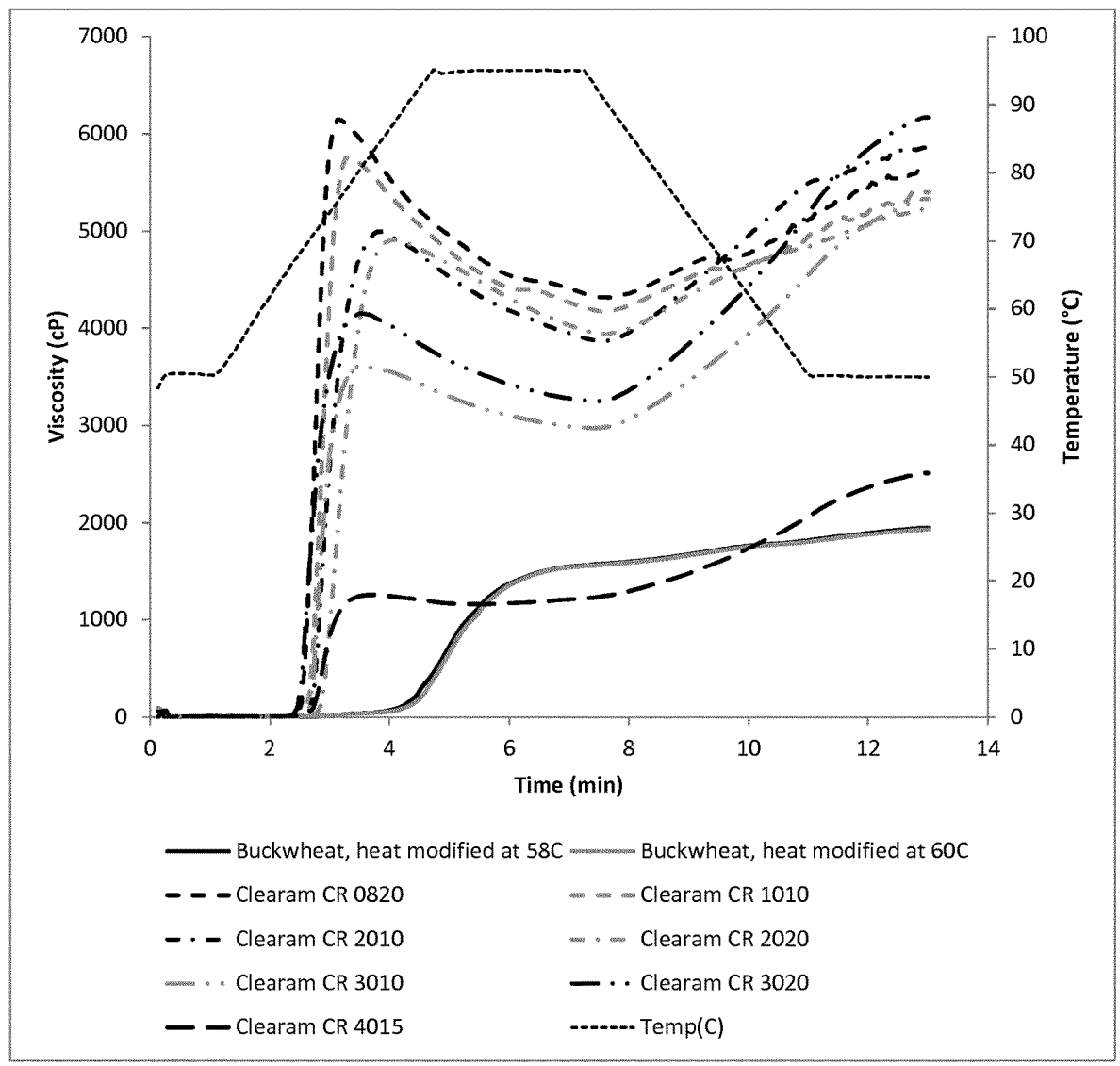
FIG. 2 shows the pasting characteristics of heat modified buckwheat starches obtained in Example 1 using a Rapid Visco Analyser (RVA) compared to the commercial products CLEARAM® CR sold by the Applicant.

The buckwheat starches heat modified at 58° C. and at 60° C. were also compared to different cross-linked starches marketed under the trademark CLEARAM® sold by the Applicant. (See FIG. 2) CLEARAM® CR is the phosphate cross-linked, hydroxypropylated waxy maize starch range, and the different number codes represent the degrees of cross-linking and substitution. As shown by the high pasting temperature of heat modified buckwheat starch, it has higher heat resistance than the CLEARAM® CR range. The viscosity stability during heating and shearing is similar to that with high degree of cross-linking (CLEARAM® CR 4015).

The RVA results are summed up in the following table:

TABLE 3

| Starch | | Pasting Temperature (° C.) | Peak Viscosity (cP) | Trough (cP) | Breakdown (cP) | Final Viscosity (cP) | Setback (cP) |
|---|---|---|---|---|---|---|---|
| Buckwheat | Heat modified at 58° C. | 88.9 | ND | ND | ND | 1952 | ND |
|  | Heat modified at 60° C. | 89.7 | ND | ND | ND | 1933 | ND |
| CLEARAM ® CR | 0820 | 67.0 | 6150 | 4312 | 1838 | 5631 | 1319 |
|  | 1010 | 68.7 | 5758 | 4172 | 1586 | 5401 | 1229 |
|  | 2010 | 69.4 | 4998 | 3865 | 1133 | 5860 | 1995 |
|  | 2020 | 71.0 | 4912 | 3937 | 975 | 5227 | 1290 |
|  | 3010 | 68.6 | 3623 | 2972 | 651 | 5332 | 2360 |
|  | 3020 | 66.1 | 4150 | 3248 | 902 | 6169 | 2921 |
|  | 4015 | 69.5 | 1256 | 1169 | 87 | 2512 | 1343 |

Example 2

Starch was extracted from 400 g buckwheat groat. After the removal of the protein and fiber, the starch slurry (around 250 g starch and 700 g water) was heated sequentially in a water bath at 55 and 58° C.; each temperature was held for at least three hours.

After heat treatment at 58° C., all of the starch samples were vacuumed filtered and then re-suspended in water before being dried using a fluidized bed dryer at about 58° C. until obtaining moisture rate lower or equal to 12%.

The starch samples were then stored few days at room temperature before performing a DSC analysis. Each sample (2-3 mg) was mixed with water at three times the weight of starch. The mixture was hermetically sealed in an aluminum pan. The pan was allowed to equilibrate for at least 1 hour and then heated from 10 to 100° C. at 10° C./min in order to obtain starch gelatinization properties.

After 7 days of storage at 4° C., the pan was equilibrated at room temperature for at least 1 hour and reanalyzed using DSC at the same temperature range and heating rate in order to obtain starch retrogradation properties.

The DSC results are summed up in the following table:

additional heating treatment. Both native and heat modified buckwheat starches show low tendency to retrograde.

The pasting properties of each (ungelatinized) sample were measured using a Rapid Visco-Analyzer (RVA) according two different methods for totals of 13 and 24 minutes. For both methods, each starch sample (2 g dry weight) was mixed with water to give a total of 25 g (8% starch suspension).

For the first method (a total of 13 minutes), the sample was isothermally heated at 50° C. for 1 minute, increased to 95° C. at 12° C./minute, held at 95° C. for 2.5 minutes, cooled to 50° C. at 12° C./minute, and finally held at 50° C. for 2 minutes. The stirring speed of the paddle was set at 960 rpm for the first 10 seconds and then decreased to 160 rpm throughout the rest of the analysis.

For the second method (a total of 23 minutes), the sample was isothermally heated at 50° C. for 1 minute, increased to 95° C. at 6° C./minute, held at 95° C. for 5 minutes, cooled to 50° C. at 6° C./minute, and finally held at 50° C. for 2 minutes. The stirring speed of the paddle was set at 960 rpm for the first 10 seconds and then decreased to 160 rpm throughout the rest of the analysis.

TABLE 4

| Buckwheat starch | | Gelatinization | | | | Melting of retrograded starch | | | | R* % |
|---|---|---|---|---|---|---|---|---|---|---|
| | | To (° C.) | Tp (° C.) | Te (° C.) | ΔH (J/g) | To (° C.) | Tp (° C.) | Te (° C.) | ΔH (J/g) | |
| Native (without additional heating treatment) | | 57.5 | 65.2 | 72.5 | 13.3 | 39.8 | 51.1 | 61.3 | 3.8 | 29.0 |
| Heat modified at 58° C. | Sample A | 67.8 | 70.6 | 73.7 | 11.4 | 40.6 | 49.3 | 59.2 | 2.9 | 25.5 |
|  | Sample B | 68.1 | 70.9 | 74.7 | 11.5 | 40.0 | 50.4 | 61.4 | 3.5 | 30.4 |

The heat modified buckwheat starches have higher gelatinization temperature than the native counterpart without The RVA results from the first method are summed up in the following table:

TABLE 5

| Buckwheat starch | Pasting Tp (° C.) | Peak Viscosity (cP) | Trough (cP) | Breakdown (cP) | Final Viscosity (cP) | Setback (cP) |
|---|---|---|---|---|---|---|
| Native (without additional heating treatment) | 79.8 | 2018 | 1858 | 160 | 2882 | 1024 |

TABLE 5-continued

| Buckwheat starch | | Pasting Tp (° C.) | Peak Viscosity (cP) | Trough (cP) | Breakdown (cP) | Final Viscosity (cP) | Setback (cP) |
|---|---|---|---|---|---|---|---|
| Heat modified at 58° C. | Sample A | 86.6 | 1845 | 1766 | 79 | 2749 | 983 |
| | Sample B | 85.6 | 1936 | 1829 | 107 | 2768 | 939 |

The RVA results from the second method are summed up in the following table:

TABLE 6

| Buckwheat starch | | Pasting Temp (° C.) | Peak Viscosity (cP) | Trough (cP) | Breakdown (cP) | Final Viscosity (cP) | Setback (cP) |
|---|---|---|---|---|---|---|---|
| Native (without additional heating treatment) | | 80.8 | 1949 | 1645 | 304 | 3062 | 1417 |
| Heat modified at 58° C. | Sample A | 84.0 | 1829 | 1684 | 145 | 3146 | 1462 |
| | Sample B | 83.2 | 1958 | 1778 | 180 | 3254 | 1476 |

The heat modified buckwheat starches have higher pasting temperatures and lower breakdown viscosities than the native counterpart without additional heating treatment during starch extraction process.

Example 3

Buckwheat starch samples extracted from two pilot trials were used to prepare the heat modified starches. During the starch extraction, the aqueous suspensions prepared by wet grinding of buckwheat groat were heated at 45° C. and 50° C. for the first and the second pilot trials, respectively, prior to the fractionation step to separate the light fraction, containing proteins, soluble carbohydrates and salts, from the heavy fraction, containing starch and fibers. The purpose of heating is to facilitate the solubilization of proteins and to prevent microbe growth.

Each extracted starch (300 g) was mixed with 700 mL water to prepare an aqueous suspension at a concentration of 30% by weight. The suspension was heated in a water bath at 50° C. for 30 minutes, then at 53° C. for 3 hours and subsequently at 55° C. overnight. Sampling was performed before increasing the temperature. After sampling, all of the starch samples were vacuum filtered and dried at 45° C. in an oven overnight. Then, the dried heat modified buckwheat starch was ground into powder.

Native pea, maize, and waxy maize starches were heat treated in the same way and used as comparison for heat and shear resistance test at pH 3 and 6.

Figure 3:
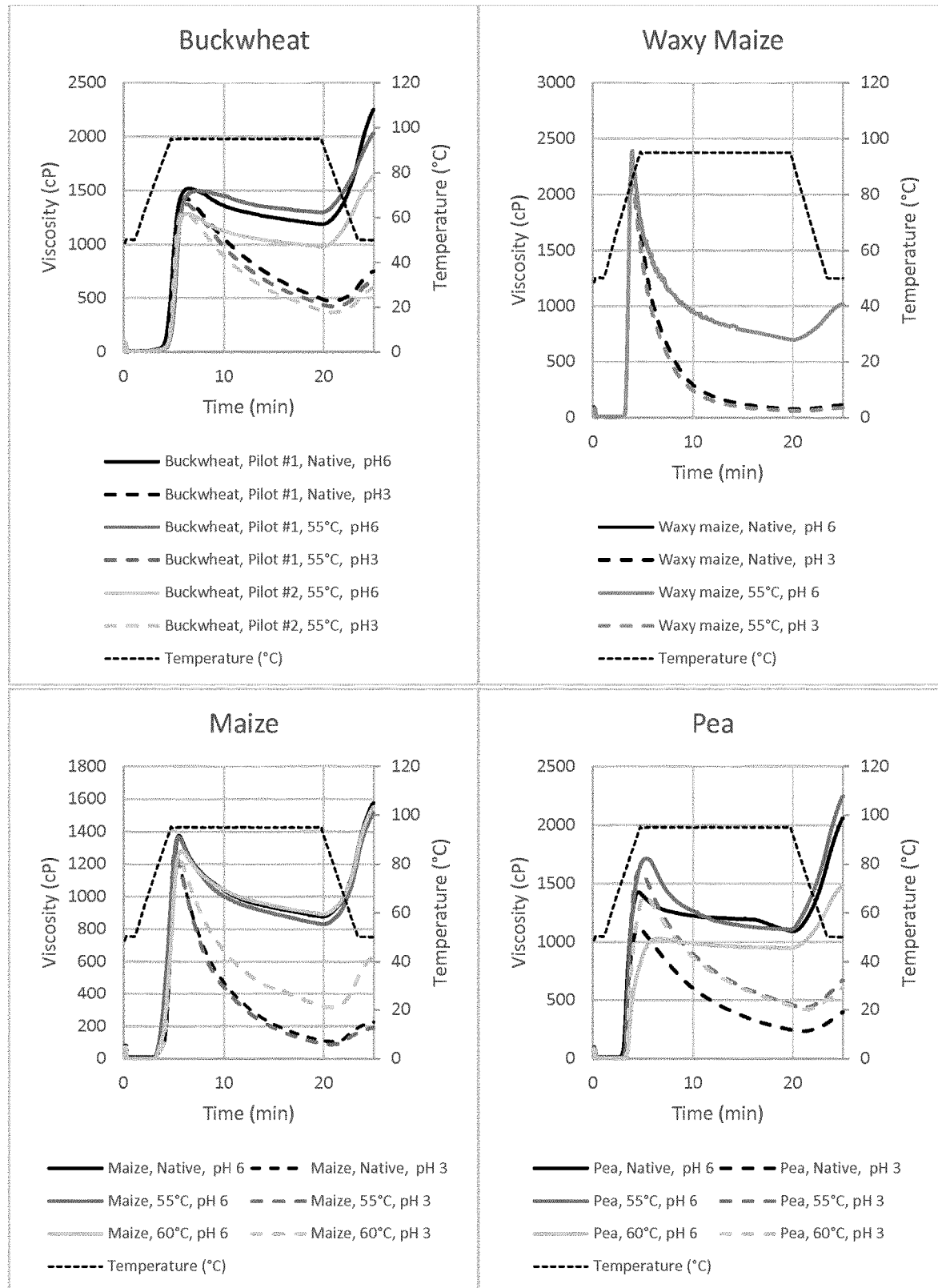
FIG. 3 illustrates the heat resistance of the heat modified starches obtained or used in Example 3 at pH 3 and 6.

For the heat and shear resistance (See FIG. 3), the starch slurry (7.4% dry substance) was isothermally heated at 50° C. for 1 minute, increased to 95° C. at 12° C./minute, held at 95° C. for 15 minutes, cooled to 50° C. at 12° C./minute, and finally held at 50° C. for 1.6 minutes. The stirring speed of the paddle was set at 960 rpm for the first 10 seconds and then decreased to 160 rpm throughout the rest of the analysis. The analysis was repeated at pH 3.0, adjusted by adding citric acid powder.

The heat/shear resistance (%) is calculated as the difference of the viscosity at the end of isothermal heating at 95° C. and peak viscosity divided by the peak viscosity (times 100%):

$$\text{heat/shear resistance} = \frac{(\text{viscosity at heating end} - \text{peak viscosity})}{\text{peak viscosity}} \times 100\%$$

The RVA results at pH ~6 and 3 are summed up in the following table:

TABLE 7

| | | PH ~6 | | | | | pH 3 | | | | |
|---|---|---|---|---|---|---|---|---|---|---|---|
| | Samples | Pasting Tp (° C.) | Peak viscosity (cP) | Viscosity at heating end (cP) | Heat/shear resistance (%) | Final viscosity (cP) | Pasting Tp (° C.) | Peak viscosity (cP) | Viscosity at heating end (cP) | Heat/shear resistance (%) | Final viscosity (cP) |
| Buckwheat | Pilot #1, Native (processed at 45° C.) | 87.3 | 1521 | 1189 | −22% | 2249 | 91.3 | 1426 | 493 | −65% | 753 |
| | Pilot #1, heat modified at 55° C. | 92.9 | 1498 | 1299 | −13% | 2029 | 92.2 | 1373 | 441 | −68% | 670 |

TABLE 7-continued

| | | PH ~6 | | | | pH 3 | | | | |
|---|---|---|---|---|---|---|---|---|---|---|
| Samples | | Pasting Tp (° C.) | Peak viscosity (cP) | Viscosity at heating end (cP) | Heat/shear resistance (%) | Final viscosity (cP) | Pasting Tp (° C.) | Peak viscosity (cP) | Viscosity at heating end (cP) | Heat/shear resistance (%) | Final viscosity (cP) |
| | Pilot #2, heat modified at 55° C. | 92.1 | 1292 | 982 | −24% | 1640 | 91.4 | 1304 | 388 | −70% | 600 |
| Waxy maize | Native | 76.0 | 2391 | 700 | −71% | 1018 | 75.8 | 2314 | 79 | −97% | 112 |
| | 55° C. | 75.1 | 2286 | 677 | −70% | 1019 | 75.9 | 2080 | 65 | −97% | 91 |
| Maize | Native | 86.5 | 1375 | 877 | −36% | 1574 | 85.7 | 1292 | 112 | −91% | 225 |
| | 55° C. | 79.2 | 1367 | 871 | −36% | 1509 | 84.0 | 1233 | 95 | −92% | 190 |
| | 60° C. | 84.0 | 1280 | 892 | −30% | 1548 | 85.7 | 1229 | 324 | −74% | 632 |
| Pea | Native | 73.6 | 1427 | 1095 | −23% | 2055 | 73.4 | 1118 | 248 | −78% | 395 |
| | 55° C. | 75.9 | 1713 | 1107 | −35% | 2243 | 75.9 | 1615 | 465 | −71% | 671 |
| | 60° C. | 79.1 | 1030 | 948 | −8% | 1480 | 77.4 | 1391 | 453 | −67% | 609 |

Based on the results above, at pH ~6, the heat modified buckwheat starches have higher pasting temperature than the native buckwheat starch. Similar effect is also observed from pea starch, but it is not obvious from maize starch and waxy maize starch. The heat modified buckwheat starches and the heat modified pea starches have higher heat and shear resistance than the heat modified maize starches and the heat modified waxy maize starch at both pH 3 and 6. The heat modified buckwheat starches according to the process of the present invention have the highest pasting temperature at both pH 3 and 6 among all of the starch samples tested.

Example 4

RVA and DSC analyses were performed on the heat modified buckwheat starches from the two pilot trials mentioned in Example 3 and compared with different commercial modified starches of the prior art known for yogurt application. The DSC method is the same as in Examples 1 and 2.

The commercial modified starches of the prior art known for yogurt application are as follows.

CLARIA+® is a clean label inhibited starch sold by Tate & Lyle. NOVATION 2300 ® is a clean label inhibited starch sold by Ingredion. Both are of waxy maize based.

CLEARAM® CJ 5025 is sold by the Applicant and corresponds to phosphate cross-linked, acetylated waxy maize starch (chemically modified starch), specifically produced for yogurt application.

The DSC results are summed up in the following table:

TABLE 8

| | | Gelatinization | | | | Melting of retrograded starch | | | | |
|---|---|---|---|---|---|---|---|---|---|---|
| Samples | | To (° C.) | Tp (° C.) | Te (° C.) | ΔH (J/g) | To (° C.) | Tp (° C.) | Te (° C.) | ΔH (J/g) | R* (%) |
| Starch according to the present invention | | | | | | | | | | |
| Buckwheat starch from first pilot trial | Native (processed at 45° C.) | 59.9 | 64.6 | 71.0 | 10.45 | 36.8 | 47.5 | 58.1 | 3.52 | 34 |
| | Heat modified at 53° C. | 61.4 | 65.8 | 70.6 | 9.72 | 40.0 | 48.4 | 57.2 | 4.9 | 50 |
| | Heat modified at 55° C. | 62.9 | 66.6 | 71.6 | 11.03 | 37.7 | 48.1 | 58.0 | 3.6 | 33 |
| Buckwheat starch from second pilot trial | Native (processed at 50° C.) | 60.4 | 65.2 | 71.2 | 9.98 | 35.8 | 47.6 | 58.9 | 3.37 | 34 |
| | Heat modified at 53° C. | 61.2 | 65.8 | 71.0 | 9.8 | 39.0 | 48.4 | 57.5 | 2.73 | 28 |
| | Heat modified at 55° C. | 63.0 | 66.7 | 71.5 | 10.58 | 38.7 | 49.0 | 58.8 | 4.18 | 40 |
| Comparative examples | | | | | | | | | | |
| CLARIA+ ® | | 63.0 | 68.9 | 74.3 | 9.21 | 40.8 | 51.7 | 61.0 | 4.48 | 49 |
| NOVATION ® 2300 | | 60.9 | 67.0 | 72.1 | 11.25 | 39.6 | 51.5 | 61.0 | 7.14 | 63 |
| CLEARAM ® CJ 5025 | | 62.2 | 67.6 | 73.2 | 14.26 | 41.9 | 52.5 | 60.0 | 1.43 | 10 |

The native buckwheat starch from the first pilot trial has slightly lower gelatinization temperature than that from the second pilot trial because the heating temperature used for the starch extraction process in the second pilot trial was higher than that in the first pilot trial. The gelatinization temperatures of the heat modified buckwheat starches, however, are similar for the two pilot trials when the starches were treated at the same temperature.

The buckwheat starches heat modified at 53° C. have slightly lower gelatinization temperature than those heat modified at 55° C. The former has similar onset gelatinization temperature as NOVATION® 2300, and the latter has similar onset gelatinization temperature as CLARIA+®.

The retrograded starches prepared from the native buckwheat starches have slightly lower melting temperature than those prepared from the heat modified buckwheat starches. The buckwheat starches heat modified at 53° C. and 55° C. have similar melting temperature of retrograded starches. CLARIA+®, NOVATION® 2300 and CLEARAM® CJ 5025 being waxy maize based starches have slightly higher melting temperatures of retrograded starches than the native and heat modified buckwheat starches. Among the commercial starches, CLEARAM® CJ 5025 shows the lowest retrogradation rate. That means that it exhibits the highest stability during refrigeration. The heat modified buckwheat starches according to the process of the present invention, in general, have lower retrogradation rates than CLEARAM® CJ 5025, CLARIA+® and NOVATION® 2300. Thus, the heat modified buckwheat starches according to the process of the present invention exhibit higher stability during refrigeration than commercial waxy maize based chemically modified starch, such as CLEARAM® CJ 5025, and clean label modified starches, such as CLARIA+® and NOVATION® 2300.

For RVA, the sample was isothermally heated at 50° C. for 1 minute, increased to 95° C. at 6° C./minute, held at 95° C. for 5 minutes, cooled to 50° C. at 6° C./minute, and finally held at 50° C. for 2 minutes. The stirring speed of the paddle was set at 960 rpm for the first 10 seconds and then decreased to 160 rpm throughout the rest of the analysis. The RVA results are summed up in the following table:

(decreasing viscosity with further shearing) or higher shear resistance. Furthermore, highly swollen granules are highly susceptible to shear thinning, and hence waxy maize based clean label starches can be easily disintegrated by harsh food processing, such as homogenization during yogurt making process.

Figure 4:
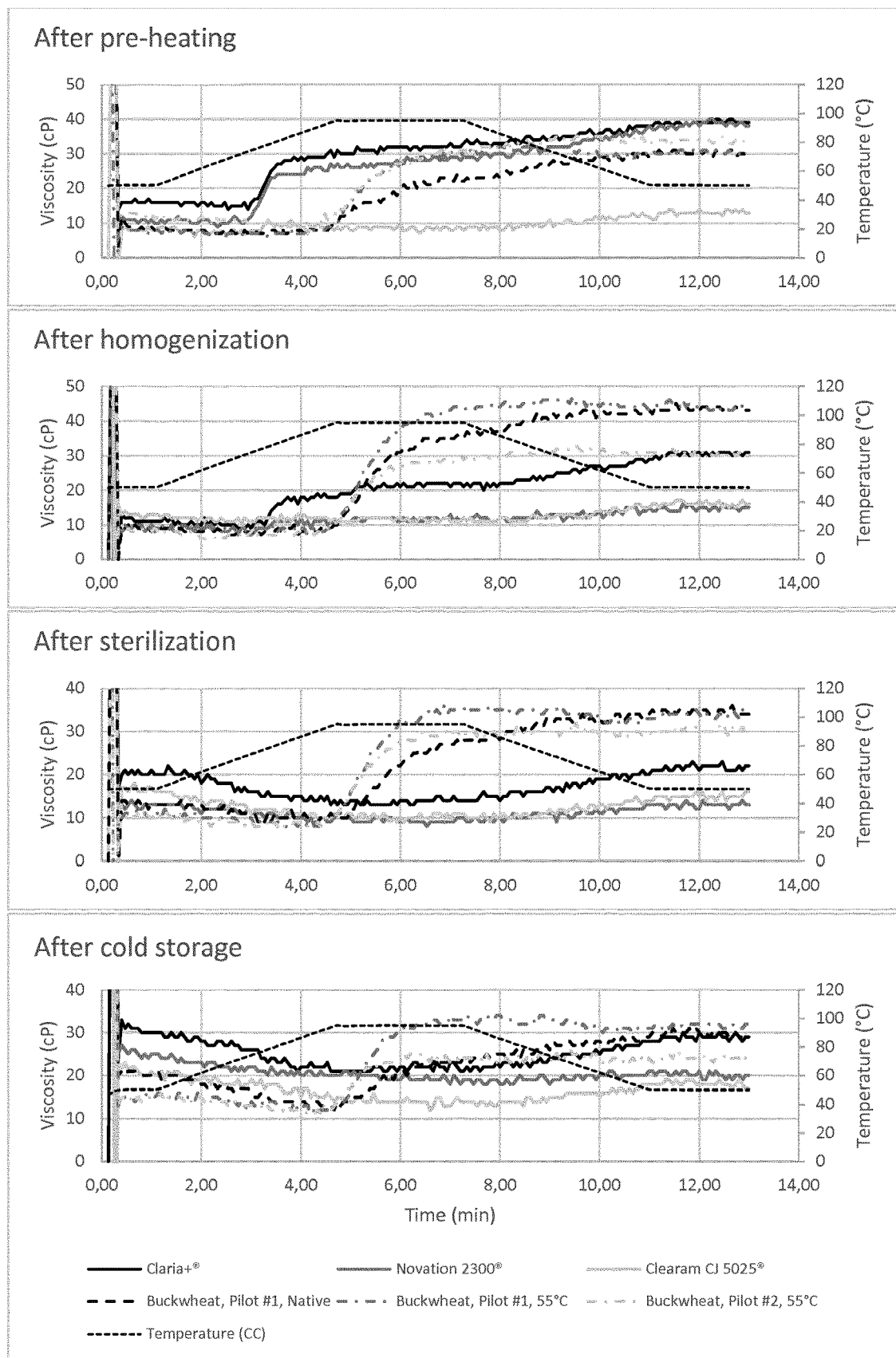
FIG. 4 shows the pasting profiles of native buckwheat starch and heat modified buckwheat starches obtained or used in Example 4 after each process step, before pre-heating, after pre-heating, after homogenization, and after sterilization.

RVA was also performed on the heat modified buckwheat starches after common processes for yogurt making (pre-heating, homogenization and sterilization) and compared with the native buckwheat starch and the different commercial starches. (See FIG. 4 for the results of RVA) Each starch was mixed with water to make 2.5% starch suspension. Sucrose (7.6%) was added to the suspension. The suspension was pre-heated at 65° C., homogenized at 18 MPa, sterilized at 85° C. for 10 min, and finally stored at 4° C. for 7 days. At the end of each process, sample was collected for viscosity measurement (by both RVA and Brookfield viscometer).

The RVA results show that the native buckwheat starch and the heat modified buckwheat starches retain their granular structure after pre-heating, homogenization, sterilization, and cold storage, indicated by the increased viscosity during heating. CLARIA+® and NOVATION® 2300 lost their granular structure after homogenization stage and sterilization stage, respectively. CLEARAM® CJ 5025 seems to lose it ability to swell or produce viscosity after pre-heating stage.

The cold viscosity (viscosity at 50° C. before heating) is similar for all of the starch samples tested before cold storage (less than 20 cP). However, the cold viscosity of

TABLE 9

| Samples | | Pasting Temperature (° C.) | Peak viscosity (cP) | Through viscosity (cP) | Breakdown viscosity (cP) | Final viscosity (cP) | Setback viscosity (cP) |
|---|---|---|---|---|---|---|---|
| Starch according to the present invention | | | | | | | |
| Buckwheat starch from first pilot trial | Native (processed at 45° C.) | 76.7 | 3719 | 2729 | 990 | 4336 | 1607 |
| | Heat modified at 53° C. | 82.4 | 3672 | 3111 | 561 | 4545 | 1434 |
| | Heat modified at 55° C. | 82.8 | 3748 | 3144 | 604 | 4520 | 1376 |
| Buckwheat starch from second pilot trial | Native (processed at 50° C.) | 79.9 | 3784 | 2816 | 968 | 4457 | 1641 |
| | Heat modified at 53° C. | 82.8 | 3617 | 2921 | 696 | 4253 | 1332 |
| | Heat modified at 55° C. | 82.8 | 3597 | 2655 | 942 | 3938 | 1283 |
| Comparative examples | | | | | | | |
| CLARIA+ ® | | 68.4 | 8493 | 5908 | 2585 | 7492 | 1584 |
| NOVATION ® 2300 | | 67.6 | 6570 | 4377 | 2193 | 5788 | 1411 |
| CLEARAM ® CJ 5025 | | 68.0 | 9577 | 7820 | 1757 | 11385 | 3565 |

Based on the RVA results above, the heat modified buckwheat starches have higher pasting temperature than the native buckwheat starches, and all buckwheat starches have higher pasting temperature than CLARIA+®, NOVATION® 2300 and CLEARAM® CJ 5025. This means that the heat modified buckwheat starches are the best starch materials to maintain their granular structure after heating treatment with shearing compared to the native buckwheat starch, CLARIA+®, NOVATION® 2300 and CLEARAM® CJ 5025. Although the heat modified buckwheat starches have lower peak and final viscosities than the waxy maize based commercial counterparts, they have lower breakdown CLARIA+® and NOVATION® 2300 increase to higher than 20 cP after cold storage, indicating starch retrogradation taking place with these commercial starches. This phenomenon is less obvious from the native buckwheat starch and the heat modified buckwheat starches. This means that the native buckwheat starch and the heat modified buckwheat starches undergo less retrogradation during cold storage than the commercial modified starches tested here and can be used for even harsher food processing treatment than those for yogurt making.

The Brookfield viscometer results are summed up in the following table:

TABLE 10

| Samples | After homogenization (Pa·s) | After sterization (Pa·s) | After cold storage (Pa·s) |
|---|---|---|---|
| Heat modified buckwheat starches according to the present invention | | | |
| From first pilot trial Native (processed at 45° C.) | 12.4 | 22.4 | 33.2 |
| From first pilot trial Heat modified at 55° C. | 13.2 | 20.4 | 32.0 |
| From second pilot trial Heat modified at 55° C. | 11.6 | 19.6 | 30.8 |
| Comparative examples | | | |
| CLARIA+ ® | 12.4 | 34.4 | 50.4 |
| NOVATION ® 2300 | 12.0 | 22.4 | 30.0 |
| CLEARAM ® CJ 5025 | 18.8 | 28.0 | 34.4 |

After homogenization, CLEARAM® CJ 5025 has the highest viscosity while the others present similar viscosity. After sterilization, CLARIA+® shows the highest viscosity and CLEARAM® CJ 5025 has the second highest viscosity. After 7-day cold storage, all samples show increased viscosity due to the starch retrogradation. CLARIA+® presents the largest increase in viscosity, indicating low stability during cold storage. On the other hand, the other starches show similar viscosity at around 30-34 Pa·s, meaning that these starch samples, including heat modified buckwheat starches, have similar stability during cold storage, which is desirable for yoghurt making.

The microscopic images showed that the native buckwheat starch and the heat modified buckwheat starches still retain their granular structure after pre-heating, homogenization, and sterilization, whereas CLARIA+®, NOVATION® 2300, and CLEARAM® CJ 5025 show highly swollen granules and granule fragments after the same processing treatments. (See FIG. 5)

Example 5: Stabilized Starch in Yogurt

This example describes the preparation of yogurt samples containing a heat modified buckwheat starch according to the present invention, a commercially available clean label starch (according to the prior art) or a chemically cross-linked starch.
Starches Used:
Stabilized buckwheat starch (according to the present invention) was prepared as follows. Starch was extracted from 400 g buckwheat groat. After the removal of the protein and fiber, the starch slurry (around 250 g starch in 700 g water) was heated sequentially in a water bath at 55° C. for 3 hours and at 58° C. for 3 hours. The starch sample was vacuumed filtered and then re-suspended in water before being dried using a fluidized bed dryer at about 58° C. until obtaining moisture rate lower or equal to 12%.

CLEARAM® CJ 5025 and NOVATION® 2300 are commercially available starches as previously mentioned in Example 4.

Based on the RVA results in Example 4 (Table 9), the heat modified buckwheat starches have higher pasting temperature than NOVATION® 2300 and CLEARAM® CJ 5025. Indeed, heat modified buckwheat starches have pasting temperatures of around 82° C., and the pasting temperatures of NOVATION® 2300 and CLEARAM® CJ 5025 are around 68° C.

The yogurt process pre-heating temperature is around 60-70° C., more precisely 65° C., and hence the pasting temperature of starch should be higher than 65° C. to make sure that the starch granules are not excessively swollen and can tolerate the harsh shearing in homogenization process. Thus, the heat modified buckwheat starch obtained according to the process of the present invention is the best candidate and the granular structure will survive the pre-heating process.

The ingredients for yogurt making in percent by weight were as follows:

TABLE 11

| Compositions | | 1 | 2 | 3 |
|---|---|---|---|---|
| Milk | | 91.5 | 91.5 | 91.5 |
| Sucrose | | 7.5 | 7.5 | 7.5 |
| Heat modified buckwheat starch according to the present invention | | 1.0 | / | / |
| Comparative Examples | CLEARAM ® CJ 5025 | / | 1.0 | / |
| | Novation 2300 ® | / | / | 1.0 |
| Total | | 100.0 | 100.0 | 100.0 |

The process followed for obtaining yogurts is as follows:
i. stirring homogeneously all the ingredients;
ii. pre-heating of the mixture from room temperature to 65° C., which takes about 5 mins;
iii. homogenization at 18 Mpa;
iv. heating at 95° C. for 5 min;
v. cooling from 95° C. to 43° C., which takes about 15-20 mins;
vi. adding yogurt strain;
vii. fermenting at 43° C. and at pH 4.6 for 5-6 hours;
viii. smoothing for 1 min.

The morphology of the starches was also observed under a microscope at different stages of the yogurt making process: before pre-heating, after pre-heating at 65° C., and after homogenization. (See FIG. 6) Lugol solution (iodine/potassium iodide solution) was used to stain starch granules for bright field mode. Polarized light was used to observe the birefringence of the starch granules to identify its native crystalline structure.

The heat modified buckwheat starch according to the present invention is not easily gelatinized, and retains most of its native crystalline and granular structure after pre-heating at 65° C. and after homogenization, which is similar to that observed from CLEARAM® CJ 5025 (comparative starch).

Example 6

This example describes the preparation of biscuits samples containing a whole wheat flour (control), a stabilized buckwheat starch according to the present invention, a wheat starch or a buckwheat flour.

Buckwheat starch was prepared according to example 5.

Whole wheat flour, Wheat starch or Buckwheat flour

The ingredients for biscuits making in percent by weight were as follows:

TABLE 12

| Ingredients | Control (wheat flour) | Buckwheat starch formula | Wheat starch formula | Buckwheat flour formula |
|---|---|---|---|---|
| Whole wheat flour | 38 | 19 | 19 | — |
| Buckwheat starch | — | 19 | — | — |
| Wheat starch | — | — | 19 | — |
| Buckwheat flour | — | — | — | 38 |
| Sugar | 16 | 16 | 16 | 16 |
| Rolled oat powder | 14 | 14 | 14 | 14 |
| Vegetable oil | 13 | 13 | 13 | 13 |
| Nutralys wheat protein | 7.8 | 7.8 | 7.8 | 7.8 |
| Glucose syrup | 3.5 | 3.5 | 3.5 | 3.5 |
| Lecithin | 0.4 | 0.4 | 0.4 | 0.4 |
| Baking powder | 0.3 | 0.3 | 0.3 | 0.3 |
| Salt | 0.2 | 0.2 | 0.2 | 0.2 |
| Milk | 25 | 25 | 25 | 25 |
| Milk flavor | 0.4 | 0.4 | 0.4 | 0.4 |
| Total | 118.6 | 118.6 | 118.6 | 118.6 |

The quantities are expressed in percentages by weight.
The process followed for obtaining biscuits is as follows:
i. Blending homogeneously all dry ingredients to form an uniform dry mixture;
ii. Adding milk, milk flavor, lecithin, glucose syrup, and vegetable oil to the dry mixture and stirring to form an uniform dough;
iii. Rolling the dough to 3 mm thickness and shaping it in circle;
iv. Baking the shaped doughs in an oven with top temperature at 190° C. and bottom temperature at 160° C. for 10 min;
v. Allowing biscuits to cool to room temperature and sealing them in a plastic or aluminum packages.

The texture of biscuits was measured using a TA-TX2 texture analyzer by using the three point bending test (HDP/3PB) and the puncture test (P/2).

The measurements parameters are listed in table 13 below:

TABLE 13

| | Mode Compress Probe | |
|---|---|---|
| | HDP/3PB | P/2 |
| Pre-Test Speed | 1 mm/sec | 2 mm/sec |
| Test Speed | 2 mm/sec | 1 mm/sec |
| Post-Test Speed | 10 mm/sec | 10 mm/sec |
| Distance | 10 mm | 3 mm |
| Trigger Force | Auto 5 g | Auto 5 g |
| Data Acquisition Rate | 500 pps | 500 pps |

The digestibility parameters, including the calculation of digestion rate (k) and the total digestibility, were measured following the methods of Yu et al. (Food Chemistry, 2018, 241:493-501). Results are shown on FIG. 7.

The moisture content was measured using a moisture analyzer (MA45C, Sartorius) sets at 105° C.

The water activity (aw) was measured using an aw meter (HygroLab2, Rotronic).

The results are summed up in the following table:

| Index | Control (wheat flour) | Buckwheat starch formula | Wheat starch formula | Buckwheat flour formula |
|---|---|---|---|---|
| Texture | | | | |
| Crispiness (mm) | 0.44 | 0.39 | 0.47 | 0.40 |
| Average hardness (g) | 867.9 | 550.3 | 450.2 | 654.0 |
| Fragile index | 32.3 | 34.3 | 40.7 | 35 |
| Starch digestibility | | | | |
| Rate of starch digestion, k (1/min) | 0.0300 | 0.0267 | 0.0284 | 0.0233 |
| Total starch digestibility (%) | 99.0 | 90.8 | 96.4 | 97.1 |
| Observation | | | | |
| Thickness | 6.85 | 6.30 | 6.72 | 4.44 |
| Moisture (%) | 1.58 | 1.01 | 1.26 | 0.69 |
| Water activity (aw) | 0.247 | 0.091 | 0.196 | 0.217 |

Based on these results, it appears that biscuits made with wheat starch presented the lowest average hardness, followed by those with buckwheat starch.

The highest crispiness and fragile index were observed for the biscuits made with wheat starch, whereas those made with buckwheat starch and buckwheat flour presented similar values.

The control biscuits made with wheat flour presented the highest rate of starch digestion and total starch digestibility. The lowest total starch digestibility was observed for the biscuits made with buckwheat starch, whereas the lowest rate of starch digestibility was observed for the biscuits with buckwheat flour, followed by those with buckwheat starch. The biscuits made with wheat starch and buckwheat flour had very similar total starch digestibility, i.e. value between the control biscuits and the biscuits made with buckwheat starch.

The biscuits made with buckwheat starch had the lowest moisture content and water activity. Thus, they biscuits made with buckwheat starch have the longest shelf life. Furthermore, the thicknesses of the biscuits made with buckwheat starch and wheat starch were similar to the control biscuits, which was higher than those made with buckwheat flour.

In conclusion, the biscuits made with buckwheat starch presented a better texture than the control biscuits made with wheat flour, as well as the best appearance and digestibility indices in comparison with those made with wheat starch and buckwheat flour.

The invention claimed is:

1. A process for preparing a clean label stabilized buckwheat starch from native buckwheat starch, wherein said native buckwheat starch is a starch portion which has been previously extracted from buckwheat groat or flour recovered from buckwheat *Fagopyrum esculentum* grains, the process comprising the steps of:
   a) preparing a suspension of native buckwheat starch in an aqueous medium at a temperature T1 comprised between room temperature and 50° C.;

b) heating the aqueous suspension up to a temperature Ts not exceeding 60° C., being Ts comprised in the range from 53° C. to 58° C., said heating step comprising:
  i. a first stage of slow heating, at a rate comprised between 0.2° C. and 5° C. per hour, heating stepwise from T1 up to said temperature Ts, said temperature Ts comprised in the range from 53 to 58° C. and,
  ii. a second stage of heating at said temperature Ts for a time which is at least 30 minutes, so as to obtain the stabilized buckwheat starch,
c) separating the stabilized buckwheat starch from the aqueous medium;
d) drying said stabilized buckwheat starch; and
e) recovering said stabilized buckwheat starch,
wherein the process is carried out without using chemicals.

2. The process according to claim 1, wherein the first stage of the heating step b) comprises at least two successive isothermal heating steps, respectively at a temperature T2 and T3, each isothermal heating step being independently of at least 30 minutes.

3. The process of claim 2, wherein each isothermal heating step is independently of 1 to 4 hours.

4. The process of claim 2, wherein each isothermal heating step is of 3 hours.

5. The process according to claim 1, wherein the process is free of organic solvents and free of chemical reactants.

6. The process according to claim 1, wherein the step of drying d) is carried out at a temperature comprised between room temperature and the buckwheat starch gelatinization temperature and is stopped when the stabilized buckwheat starch has a moisture rate lower or equal to 12%.

7. The process according to claim 1, wherein step a) comprises preparing a suspension of native buckwheat starch in an aqueous medium the suspension of native buckwheat starch in an aqueous medium at a concentration from 20 to 50% by weight.

8. The process according to claim 1, wherein step a) comprises preparing a suspension of native buckwheat starch in an aqueous medium the suspension of native buckwheat starch in an aqueous medium at a concentration from 30 to 40% by weight.

9. The process of claim 1, wherein in the first stage of slow heating, the temperature Ts is comprised in the range from 53° C. to 55° C.

10. The process of claim 1, wherein the time is from 0.5 to 24 hours.

11. The process of claim 1, wherein the time is from 1 to 18 hours.

12. The process of claim 1, wherein the time is 3 hours.

13. The process according to claim 1, wherein the suspension of native buckwheat starch of step a) is prepared at a temperature T1 comprised between room temperature and 45° C.

14. A stabilized buckwheat starch made by the process according to claim 1, wherein said stabilized buckwheat starch has an onset gelatinization temperature measured by Differential Scanning calorimetry (DSC) up to 10° C. higher than the onset gelatinization temperature of the native buckwheat starch.

15. The stabilized buckwheat starch according to claim 14, wherein said stabilized buckwheat starch has an onset gelatinization temperature measured by DSC comprised between 6° and 69° C.

16. The stabilized buckwheat starch according to claim 14, wherein said stabilized buckwheat starch has a retrogradation rate measured by DSC comprised between 23 and 40%, after 7-day storage at 4° C. upon gelatinization.

17. The stabilized buckwheat starch according to claim 14, wherein, said stabilized buckwheat starch has a pasting temperature measured by Rapid Visco Analyser (RVA) comprised between 8° and 95° C.

18. The stabilized buckwheat starch according to claim 14, wherein said stabilized buckwheat starch has a retrogradation rate measured by DSC comprised between 23 and 33% after 7-day storage at 4° C. upon gelatinization.

19. The stabilized buckwheat starch according to claim 14, wherein said stabilized buckwheat starch has a pasting temperature measured by Rapid Visco Analyser (RVA) comprised between 82 and 93° C.

20. The stabilized buckwheat starch according to claim 14, wherein said stabilized buckwheat starch has a pasting temperature measured by Rapid Visco Analyser (RVA) comprised between 85 and 90° C.

21. A food product, comprising the stabilized buckwheat starch according to claim 14.

22. The food product according to claim 21, wherein said food product is a yogurt.

23. The food product according to claim 21, wherein said food product is a biscuit.

* * * * *